United States Patent [19]

Brown et al.

[11] 4,262,766
[45] Apr. 21, 1981

[54] DIFFERENTIAL HOUSING MOUNTING SUPPORT

[75] Inventors: Vaikai K. Brown, Thompson; Roy M. Gedeon, Cleveland; David T. Ping, Mentor, all of

[73] Assignee: Towmotor Corporation, Mentor, Ohio

[21] Appl. No.: 90,968

[22] Filed: Nov. 5, 1979

[51] Int. Cl.³ .............................................. B60K 17/16
[52] U.S. Cl. ......................................... 180/75; 180/88
[58] Field of Search .................. 180/75, 88; 403/26, 403/166, 109; 64/1 R, 1S, 1 C

[56] References Cited

U.S. PATENT DOCUMENTS

| 2,410,133 | 10/1946 | Spatta | 180/75 |
| 3,305,204 | 2/1967 | Babin | 403/166 |
| 3,679,244 | 7/1972 | Reddy | 403/109 |
| 3,963,089 | 6/1976 | Crawford | 180/75 |
| 4,100,986 | 7/1978 | Shipitalo | 180/75 |

Primary Examiner—John J. Love
Assistant Examiner—Donn McGiehan
Attorney, Agent, or Firm—John W. Grant; Richard E. Phillips

[57] ABSTRACT

A mounting support for releasably connecting a transaxle or differential housing (10) to a vehicle frame (12) has a support sleeve (13) telescopically connected to both a cylindrical portion (16) of a support member (14) connected to the frame (12) and a cylindrical protrusion (19) of the housing (10). Axial movement of the support sleeve (13) is selectively limited by a snap ring retainer (31) seated in an annular groove (24) in the annular protrusion (19). The support sleeve (13) is cylindrical so that only a minimal amount of clearance between it and adjacent components is required.

8 Claims, 1 Drawing Figure

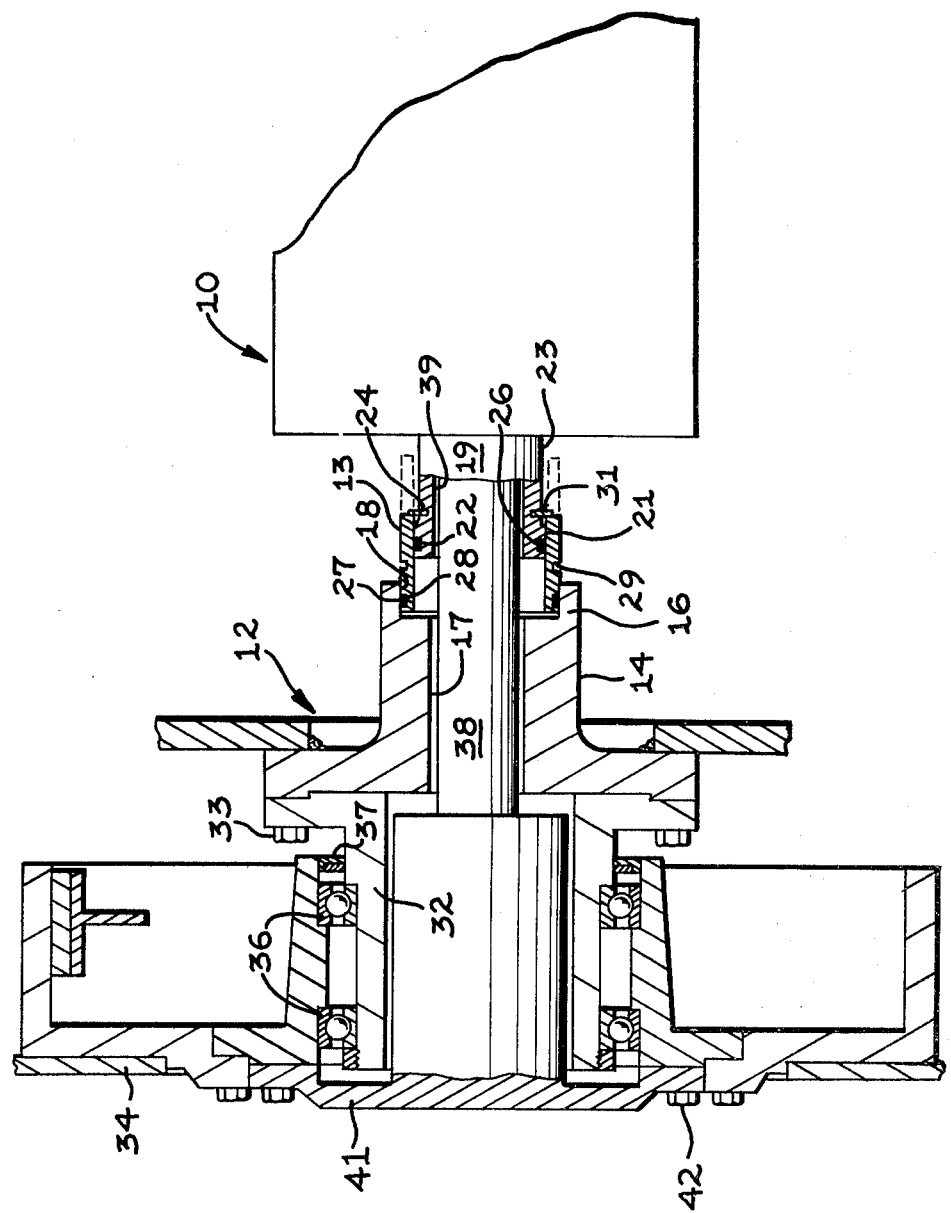

4,262,766

DIFFERENTIAL HOUSING MOUNTING SUPPORT

DESCRIPTION

1. Technical Field

This invention relates generally to a differential housing mounting support for releasably connecting the differential housing to a vehicle frame.

2. Background Art

In many vehicles, lift trucks for example, it is desirable to connect the differential or tansaxle housing to the wheel spindle or frame in such a way that the housing can be readily disconnected for removal from the vehicle with minimal disassembly of the final drive components, and so that the stresses imposed on the vehicle frame are not transferred to the differential housing. One such connection is disclosed in U.S. Pat. No. 4,100,986 issued to William M. Shipitalo on July 18, 1978 in which a split pillow block interconnects the differential housing and the spindle. The split pillow block has a tubular collar disposed about one end of a spindle positioned adjacent the housing, an integral partial collar disposed partially about the differential housing and a separate partial collar mating with the integral partial collar and removable secured thereto by bolts and nuts. However, that split pillow block design is not feasible for some vehicles due to limited clearances for the ears of the collar and for insertion of the bolts and nuts.

DISCLOSURE OF THE INVENTION

In one aspect of the present invention a differentail housing mounting support for releasably connecting a housing of the differential to a vehicle frame includes a support member connected to the vehicle frame, a cylindrical protrusion on the housing in axial alignment with a cylindrical portion of the support member, a support sleeve telescopically connected to both the cylindrical portion and the cylindrical protrusion and means for selectively limiting axial movement of the support sleeve relative to one of the cylindrical portion or cylindrical protrusion.

The invention as claimed solves the problem of clearance with the components in close proximity to the connection between the differential housing and the wheel spindle by using a support sleeve slidably positioned on the differential housing and telescopically connected to the support member. The cylindrical nature of the support sleeve requires only minimal clearance therearound, is simpler and has fewer parts than the heretofore known mounting support devices.

BRIEF DESCRIPTION OF THE DRAWINGS

The sole FIGURE is a diagrammatic sectional view of an embodiment of the present invention.

BEST MODE FOR CARRYING OUT THE INVENTION

Referring to the drawing a transaxle or differential housing, partially shown at 10, is releasably connected to a vehicle frame, partially shown at 12, by a support sleeve 13. A support member 14 is connected to the vehicle frame 12 as by welding or the like and has a cylindrical portion 16 extending toward housing 10. The support member has a bore 17 extending transversely therethrough and a bore 18 in the cylindrical portion opening toward the housing 10.

The housing 10 has a cylindrical protrusion 19 positioned in axial alignment with cylindrical portion 16 of support member 14. The axial protrusion has an outer surface 21 at the outer end thereof, an annular groove 22 in the outer surface, a reduced diameter portion 23 and an annular groove 24 in the reduced diameter portion.

The support sleeve 13 is telescopically connected to both the cylindrical portion 16 of support member 14 and cylindrical protrusion 19 of housing 10. Specifically, support sleeve 13 is slidably positioned on outer surface 21 of cylindrical protrusion 19 and slidably extends into bore 18 of support member 14. A seal 26 is seated in annular groove 22 for sealing between the inner surface of support sleeve 13 and cylindrical protrusion 19. Similarly, a seal 27 is seated in an annular groove 28 in support sleeve 13 for sealing between the bore 18 and support sleeve 13.

An annular groove 29 is provided in the outer surface of support sleeve 13 intermediate the ends thereof and is adapted for receiving an appropriate tool for sliding the support sleeve axially during assembly and disassembly.

A means, for example a snap ring retainer 31 seated in the annular groove 24, is provided for selectively limiting axial movement of support sleeve 13 relative to cylindrical protrusion 19. Alternatively, the cylindrical portion 16 of support member 14 could be provided with an external cylindrical surface of a size for telescopically slidably receiving the support sleeve 13 and the snap ring retainer 31 could be seated in a groove in such external cylindrical surface.

A wheel spindle 32 is connected to support member 14 as by bolts 33. A wheel 34 is rotatably mounted on wheel spindle 32 by a pair of bearings 36. A seal 37 is sealingly positioned between wheel spindle 32 and wheel 34. A drive shaft 38 extends through the hollow wheel spindle 32, bores 17,18 of support member 14, support sleeve 13, a bore 39 in cylindrical protrusion 19 and has its inner end drivingly connected to the differential or the like, not shown, in the usual manner. A flange 41 on the outer end of drive shaft 18 is drivingly connected to wheel 34 by bolts 42.

It is to be understood that the above described components are duplicated on the opposite side of the vehicle so that opposite sides of the differential housing 10 are releasably connected to the frame at opposite sides of the vehicle.

INDUSTRIAL APPLICABILITY

To remove the differential housing 10 from the vehicle, the initial step is to remove bolts 42 and extract drive shaft 38 sufficiently such that its inner end clears the end of cylindrical protrusion 19. Then with housing 10 suitably supported, snap ring retainer 31 is removed or slid toward housing 10 and support sleeve 13 slid inwardly on the outer surface 21 of cylindrical protrusion 19 to the broken line position by a suitable tool inserted into annular groove 29. At that time housing 10 and differential contained therein can be readily removed from the vehicle while wheel 34 and wheel spindle 32 remain intact on the vehicle.

To reassemble housing 10 to the vehicle the above steps are reversed.

In the assembled position shown in the drawing an open passage is provided between differential housing 10 and the cavity in the wheel spindle for common lubrication of both the differential and bearings 36 on wheel spindle 32. Further, although drive shaft 38 is shown as being directly connected to wheel 34 in this embodiment, the drive shaft can be drivingly connected to the wheel through a planetary gear or other final drive arrangement positioned within the wheel spindle.

In view of the above it is readily apparent that the structure of the present invention provides an improved mounting support for releasably connecting a differential or transaxle housing to a vehicle frame. The number of components have been reduced and the support sleeve 13 being cylindrical requires less space between the support sleeve and surrounding components. The joint between support sleeve 13 and cylindrical portion 16 and cylindrical protrusion 19 is readily sealed so that a common lubricating fluid can be used for lubricating bearings 36 and differential.

Other aspects, objects and advantages of this invention can be obtained from a study of the drawings, the disclosure and the appended claims.

We claim:

1. A differential housing mounting support for releasably connecting a housing (10) to a vehicle frame (12) comprising:
   a support member (14) connected to the vehicle frame (12) having a bore (18) therein opening in a direction facing said housing (10);
   a protrusion (19) on said housing (10) axially aligned with said bore (18);
   a support sleeve (13) slidably positionable on said protrusion (19) between a support member engaging position supporting said housing (10) wherein said support sleeve (13) is disposed within said bore (18) and a support member releasing position wherein said support sleeve (13) is removed a spaced distance from said bore (18).

2. The differential housing mounting support of claim 1 including means (31) for selectively limiting axial movement of said support sleeve (13) relative to one of said support member (14) and said protrusion (19).

3. The differential housing mounting support of claim 2 wherein said means (31) includes a snap ring retainer.

4. The differential housing mounting support of claim 1 wherein said protrusion (19) is cylindrical and said bore (18) is cylindrical.

5. The differential housing mounting support of claim 4 wherein said support sleeve (13) is substantially a hollow cylinder slidable over said protrusion (19) and slidable within said bore (18) such that when in said support member engaging position, said support sleeve (13) joins and is between said support member (14) and said protrusion (19).

6. The differential housing mounting support of claim 1 including a first seal (27) positioned between said support sleeve (13) and said support member (14) and a second seal (26) sealingly positioned between said support sleeve (13) and said protrusion (19).

7. The differential housing mounting support of claim 1 wherein said support member (14) has a cylindrical portion (16) extending toward said housing (10).

8. A differential housing mounting support for releasably connecting a housing (10) to a vehicle frame (12) comprising:
   a support member (14) connected to the vehicle frame (12) and having a cylindrical portion (16) extending toward the housing (10), said cylindrical portion (16) having a bore (18) therein;
   a cylindrical protrusion (19) on the housing (10) in axial alignment with the cylindrical portion (16);
   a support sleeve (13) positioned on an outer surface (21) of the cylindrical protrusion (19) and axially slidable thereon between a support member engaging position supporting said housing (10) wherein said support sleeve (13) is disposed within said bore (18) and a support member releasing position wherein said support sleeve (13) is removed a spaced distance from said bore (18);
   means (31) for selectively limiting axial movement of the support sleeve (13) relative to one of the cylindrical portion (16) and cylindrical protrusion (19); and
   a first seal (27) positioned between the support sleeve (13) and the cylindrical portion (16) and a second seal (26) sealingly positioned between the support sleeve (13) and the cylindrical protrusion (19).

* * * * *